US010601714B2

(12) United States Patent
Srebro et al.

(10) Patent No.: US 10,601,714 B2
(45) Date of Patent: *Mar. 24, 2020

(54) ADAPTIVE FLOW PRIORITIZATION

(71) Applicant: Mellanox Technologies TLV Ltd., Raanana (IL)

(72) Inventors: Eyal Srebro, Yokneam Moshava (IL); Sagi Kuks, Ramat Gan (IL); Liron Mula, Ramat Gan (IL); Barak Gafni, Campbell, CA (US); Benny Koren, Zichron Yaakov (IL); George Elias, Tel Aviv (IL); Itamar Rabenstein, Petach Tikva (IL); Niv Aibester, Herzliya (IL)

(73) Assignee: Mellanox Technologies TLV Ltd., Raanana (IL)

( * ) Notice: Subject to any disclaimer, the term of this patent is extended or adjusted under 35 U.S.C. 154(b) by 36 days.

This patent is subject to a terminal disclaimer.

(21) Appl. No.: 15/963,118

(22) Filed: Apr. 26, 2018

(65) Prior Publication Data

US 2018/0241677 A1 Aug. 23, 2018

Related U.S. Application Data

(63) Continuation-in-part of application No. 15/194,585, filed on Jun. 28, 2016, now Pat. No. 9,985,910.

(51) Int. Cl.
*H04L 12/801* (2013.01)
*H04L 12/863* (2013.01)
(Continued)

(52) U.S. Cl.
CPC .......... *H04L 47/12* (2013.01); *H04L 47/2441* (2013.01); *H04L 47/6215* (2013.01);
(Continued)

(58) Field of Classification Search
CPC . H04L 47/12; H04L 47/6255; H04L 47/2441; H04L 47/6275; H04L 47/6295;
(Continued)

(56) References Cited

U.S. PATENT DOCUMENTS 6,154,446 A 11/2000 Kadambi et al.
6,678,277 B1 1/2004 Wils et al.
(Continued)

OTHER PUBLICATIONS

U.S. Appl. No. 15/081,969 office action dated May 17, 2018.
(Continued)

*Primary Examiner* — Vinncelas Louis
(74) *Attorney, Agent, or Firm* — Kligler & Associates Patent Attorneys Ltd

(57) ABSTRACT

A method for communication includes receiving and forwarding packets in multiple flows to respective egress interfaces of a switching element for transmission to a network. For each of one or more of the egress interfaces, in each of a succession of arbitration cycles, a respective number of the packets in each of the plurality of the flows that are queued for transmission through the egress interface is assessed, and the flows for which the respective number is less than a selected threshold to a first group, while assigning the flows for which the respective number is equal to or greater than the selected threshold are assigned to a second group. The received packets that have been forwarded to the egress interface and belong to the flows in the first group are transmitted with a higher priority than the flows in the second group.

16 Claims, 2 Drawing Sheets

(51) Int. Cl.
*H04L 12/865* (2013.01)
*H04L 12/927* (2013.01)
*H04L 12/851* (2013.01)

(52) U.S. Cl.
CPC ...... *H04L 47/6255* (2013.01); *H04L 47/6275* (2013.01); *H04L 47/6295* (2013.01); *H04L 47/805* (2013.01)

(58) Field of Classification Search
CPC .............. H04L 47/6215; H04L 47/805; H04L 12/6418
See application file for complete search history.

(56) References Cited

U.S. PATENT DOCUMENTS

| | | | |
|---|---|---|---|
| 6,859,435 | B1 | 2/2005 | Lee et al. |
| 7,346,059 | B1 | 3/2008 | Gamer et al. |
| 7,738,454 | B1 | 6/2010 | Panwar et al. |
| 7,778,168 | B1 | 8/2010 | Rodgers et al. |
| 7,813,348 | B1 | 10/2010 | Gupta et al. |
| 7,872,973 | B2 | 1/2011 | Sterne et al. |
| 7,894,343 | B2 | 2/2011 | Chao et al. |
| 8,565,092 | B2 | 10/2013 | Arumilli et al. |
| 8,630,294 | B1 | 1/2014 | Keen et al. |
| 8,811,183 | B1 | 8/2014 | Anand et al. |
| 9,385,962 | B2 | 7/2016 | Rimmer et al. |
| 9,648,148 | B2 | 5/2017 | Rimmer et al. |
| 9,742,683 | B1* | 8/2017 | Vanini ................. H04L 47/6215 |
| 2002/0055993 | A1 | 5/2002 | Shah et al. |
| 2005/0204103 | A1 | 9/2005 | Dennison |
| 2005/0228900 | A1 | 10/2005 | Stuart et al. |
| 2006/0087989 | A1 | 4/2006 | Gai et al. |
| 2007/0097257 | A1 | 5/2007 | El-Maleh et al. |
| 2014/0269274 | A1 | 9/2014 | Banavalikar et al. |
| 2014/0286349 | A1* | 9/2014 | Kitada ................. H04L 47/6215 370/412 |
| 2016/0191392 | A1* | 6/2016 | Liu ..................... H04L 12/6418 370/235 |
| 2016/0337257 | A1 | 11/2016 | Yifrach et al. |
| 2017/0118108 | A1 | 4/2017 | Avci et al. |
| 2017/0295112 | A1 | 10/2017 | Cheng et al. |
| 2018/0205653 | A1 | 7/2018 | Wang et al. |

OTHER PUBLICATIONS

U.S. Appl. No. 15/432,962 office action dated Apr. 26, 2018.
U.S. Appl. No. 15/161,316 Office Action dated Jul. 20, 2018.
U.S. Appl. No. 15/432,962 office action dated Nov. 2, 2018.
U.S. Appl. No. 15/469,652 office action dated Nov. 2, 2018.
U.S. Appl. No. 15/161,316 Office Action dated Dec. 11, 2018.
EP Application # 17178355.8 office action dated Nov. 13, 2018.
EP Application # 17178355.8 office action dated Jul. 15, 2019.

* cited by examiner

ADAPTIVE FLOW PRIORITIZATION

CROSS-REFERENCE TO RELATED APPLICATION

This application is a continuation-in-part of U.S. patent application Ser. No. 15/194,585, filed Jun. 28, 2016, which is incorporated herein by reference.

FIELD OF THE INVENTION

The present invention relates generally to data communication networks, and particularly to prioritized forwarding of data packets in such networks.

BACKGROUND

Switching elements in modern packet communication networks commonly give priority to certain flows over others based on considerations such as differentiated quality of service (QoS) and congestion avoidance. (The term "switching elements" is used herein to refer to network elements having multiple interfaces to the network, such as network ports, through which packets are received and transmitted, and logic for directing each received packet from its ingress to its appropriate egress interface. Switches, bridges and routers are some examples of such switching elements. A "flow" is a sequence of packets transmitted through the network from a particular source to a particular destination.) In some networks, switching elements apply adaptive flow prioritization techniques, based on considerations such as the current queue lengths of different flows.

Techniques of this sort are described, for example, by Hoeiland-Joergensen et al., in "The FlowQueue-CoDel Packet Scheduler and Active Queue Management Algorithm," published by the Internet Engineering Task Force (IETF) as draft-ietf-aqm-fq-codel-06 (Mar. 18, 2016). According to the authors, the algorithm that they describe (referred to as "FQ-CoDel") is useful in fighting "bufferbloat" and reducing latency. FQ-CoDel mixes packets from multiple flows and reduces the impact of head of line blocking from bursty traffic, as well as providing isolation for low-rate traffic such as DNS, Web, and videoconferencing traffic. The algorithm is said to improve utilization across the networking fabric, especially for bidirectional traffic, by keeping queue lengths short.

Another flow prioritization technique is described in an Advantage Series White Paper entitled "Smart Buffering," published by Cisco Systems, Inc. (San Jose, Calif., 2016). According to this White Paper, Cisco Nexus® switches use packet prioritization to provide latency benefits for small flows under load by automatically giving priority to the first few packets from each flow. A threshold is used to determine the number of packets that have been seen from a flow. If the number of packets received from the flow is less than the prioritization threshold, the packets are prioritized; otherwise, they are not. This mechanism allows short flows to have priority in both the switch and the network to reduce the number of drops, which have significantly greater impact on short flows than on long-lived flows.

SUMMARY

Embodiments of the present invention that are described hereinbelow provide improved methods for forwarding packets in a network and apparatus implementing such methods.

There is therefore provided, in accordance with an embodiment of the invention, a method for communication, which includes receiving from a packet data network, via ingress interfaces of a switching element, packets belonging to multiple flows, and forwarding the packets to respective egress interfaces of the switching element for transmission to the network. For each egress interface of the switching element, the packets, belonging to a plurality of the flows, that have been forwarded are queued for transmission through the egress interface. For each of one or more of the egress interfaces, in each of a succession of arbitration cycles a respective number of the packets in each of the plurality of the flows that are queued for transmission through the egress interface is assessed. The flows for which the respective number is less than a selected threshold are assigned to a first group, while the flows for which the respective number is equal to or greater than the selected threshold are assigned to a second group. After assigning the flows, the received packets that have been forwarded to the egress interface and belong to the flows in the first group are transmitted to the network with a higher priority than the flows in the second group.

In a disclosed embodiment, assessing the respective number includes maintaining a respective counter for each flow among the plurality of the flows. The respective counter is incremented when a packet in the flow is queued for transmission and decremented when the packet is transmitted to the network.

In some embodiments, the threshold is selected adaptively, responsively to the transmission of the packets through the egress interface. In one embodiment, selecting the threshold includes monitoring respective first and second volumes of the packets that are transmitted to the network from the flows in the first and second groups, and setting the threshold responsively to a relation between the first and second volumes.

For example, setting the threshold can includes defining a target allocation of transmission volume to the second group, increasing the threshold when the relation between the first and second volumes indicates that the actual allocation of the transmission volume to the second group was less than the target allocation during a given period, and decreasing the threshold when the relation between the first and second volumes indicates that the actual allocation of the transmission volume to the second group was greater than the target allocation during a given period. In a disclosed embodiment, defining the target allocation includes simulating a weighted allocation of the transmission volume based on respective numbers of the packets queued in the flows that are assigned to the first group and to the second group.

In a disclosed embodiment, the method includes initiating a new arbitration cycle in the succession in response to an arbitration event, wherein assessing the respective number includes reassessing the respective number of the packets in each of the plurality of the flows that are queued for transmission upon initiation of the new arbitration cycle, and wherein assigning the flows includes reassigning the flows to the first and second groups based on the reassessed number.

Additionally or alternatively, transmitting the packets includes transmitting the packets that belong to the flows in the first group with a strict priority over the flows in the second group. Further additionally or alternatively, transmitting the packets includes transmitting the packets within each of the first and second groups in an order in which the packets have been queued for transmission.

In one embodiment, the packets belong to multiple different traffic classes, which have different, respective levels of quality of service (QoS), and queuing the packets includes assigning the flows to different queues according to the traffic classes, and wherein transmitting the packets includes arbitrating separately among the flows in each of one or more of the different traffic classes.

There is also provided, in accordance with an embodiment of the invention, communication apparatus, including multiple interfaces configured to serve as ingress and egress interfaces to a packet data network and to receive packets belonging to multiple flows for forwarding to respective egress interfaces for transmission to the network. Control circuitry is configured to queue the packets, belonging to a plurality of the flows, for transmission through each egress interface, and for each of one or more of the egress interfaces, in each of a succession of arbitration cycles, to assess a respective number of the packets in each of the plurality of the flows that are queued for transmission through the egress interface, to assign the flows for which the respective number is less than a selected threshold to a first group, while assigning the flows for which the respective number is equal to or greater than the selected threshold to a second group, and after assigning the flows, to transmit to the network the packets that have been forwarded to the egress interface and belong to the flows in the first group with a higher priority than the flows in the second group.

In a disclosed embodiment, the apparatus includes threshold control logic, which is configured to set the threshold adaptively, responsively to the transmission of the packets through the egress interface.

There is additionally provided, in accordance with an embodiment of the invention, a method for communication, which includes receiving from a packet data network, via ingress interfaces of a switching element, packets belonging to multiple flows, and forwarding the packets to respective egress interfaces of the switching element for transmission to the network. For each egress interface of the switching element, the packets, belonging to a plurality of the flows, that have been forwarded are queued for transmission through the egress interface. For each of one or more of the egress interfaces, a respective characteristic of each of the plurality of the flows that are queued for transmission through the egress interface is assessed, and a priority for the transmission of the packets from each of the flows to the network responsively to a comparison of the respective characteristic to a selected threshold. The threshold is selected adaptively, responsively to the transmission of the packets through the egress interface.

In a disclosed embodiment, selecting the threshold includes monitoring respective volumes of the packets that are transmitted to the network from the plurality of the flows, defining a target allocation of transmission volume among the flows, and setting the threshold responsively to a relation between the respective volumes that were transmitted to the network and the target allocation.

The present invention will be more fully understood from the following detailed description of the embodiments thereof, taken together with the drawings in which:

DETAILED DESCRIPTION OF EMBODIMENTS

Overview

Figure 1:
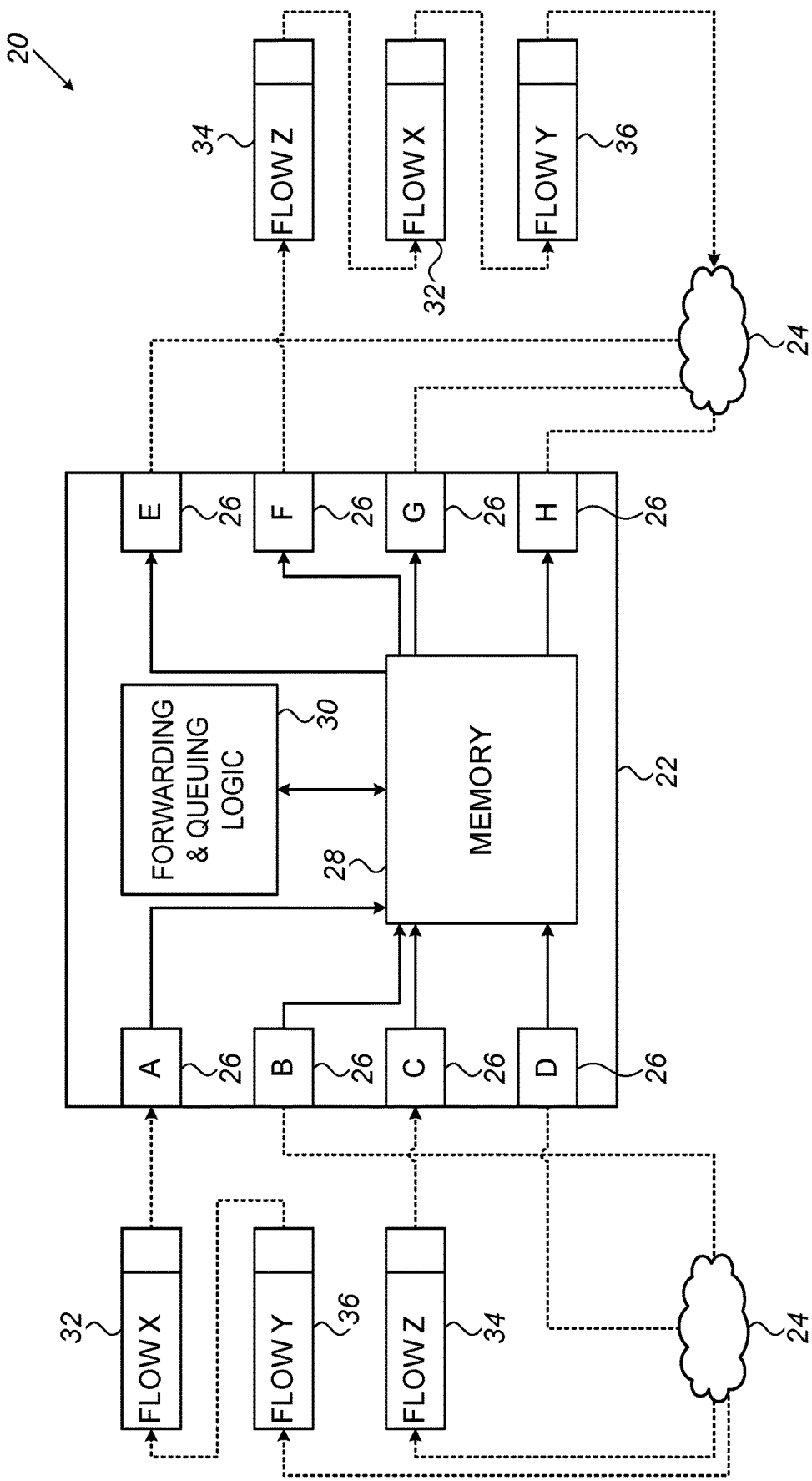
FIG. 1 is a block diagram that schematically illustrates a network communication system implementing adaptive flow prioritization, in accordance with an embodiment of the invention.

In many packet data networks, a small number of large, persistent flows, such as file transfers and long video streams, account for the majority of network traffic and hence network congestion. The transmission delays and dropped packets caused by this sort of congestion can have a serious deleterious effect on many of the smaller flows that are transmitted through the network at the same time. (As a general, empirical rule, smaller flows are more sensitive to delays and dropped packets than larger flows.) Although a number of adaptive flow prioritization techniques have been proposed as possible solutions to these problems, these techniques require the switching element to maintain large numbers of queues, along with complex hardware and/or software for implementation.

Embodiments of the present invention that are described herein provide a simple but effective solution that supports adaptive prioritization of small flows without requiring large numbers of flow queues and complex decision logic. Instead, each flow is classified as an "elephant flow" or a "mouse flow" by comparing the number of packets belonging to the particular flow that are queued for transmission through a given egress interface at a given time to a selected threshold. Flows for which the respective number of queued packets is less than the threshold are classified a mouse flows, while flows for which the respective number is equal to or greater than the threshold are classified as elephant flows. Packets belonging to the mouse flows are then transmitted with higher priority than those in the elephant flows. In other words, packets in the mouse flows are placed in one queue having high priority, while those in the elephant flows are placed in another queue with low priority.

The threshold for classifying flows as "elephants" or "mice" may be set to substantially any positive number—one or greater. In some embodiments, the threshold is selected adaptively, based on the actual transmission of the packets, in order to ensure that the elephant flows do not consume more than their fair share of the bandwidth on the one hand, but are not entirely starved by large numbers of mouse flows. For this purpose, the respective volumes of the packets that are actually transmitted to the network from the flows in the mouse and elephant groups are monitored, and the threshold is selected and periodically updated based on a relation between these actual volumes, for example by comparing the relation between the actual volumes to a target allocation of transmission volume to the elephant flows. As a general rule, when the elephant flows are found to have received too little bandwidth relative to the target allocation, the threshold is increased, thus reducing the number of mouse flows; whereas when the elephant flows have received more than enough bandwidth, the threshold is decreased.

This adaptive, threshold-based control mechanism is particularly effective when applied to the numbers of packets queued in different flows, as described further hereinbelow. Alternatively, the principles of adaptive, threshold-based control that are described herein may similarly be applied in other sorts of flow prioritization schemes, as will be apparent to those skilled in the art after reading the present description. All such alternative applications are also considered to be within the scope of the present invention.

The disclosed embodiments are typically implemented in a switching element, which comprises multiple interfaces configured to serve as ingress and egress interfaces to a packet data network. Control circuitry in the switching element receives packets belonging to multiple flows and forwards the packets to respective egress interfaces for transmission to the network. For each egress interface, the control circuitry queues the packets that have been forwarded for transmission through that interface in a transmit queue. Multiple different flows are typically forwarded to each egress interface, and thus the transmit queue typically contains packets belonging to multiple flows. In some cases, the packets belong to multiple different traffic classes, which have different, respective levels of quality of service (QoS). In such cases, the flows are assigned to multiple different transmit queues according to the traffic classes, in which case the prioritization techniques described herein are applied separately to each of the transmit queues (or to a certain subset of the transmit queues), thus prioritizing the small flows in each of the corresponding traffic classes.

In order to prioritize the flows that have been forwarded to a given egress interface (within a given traffic class), the control circuitry assesses the respective number of packets belonging to each flow that are queued for transmission through the egress interface at a given time. The flows for which the respective number is less than the selected threshold—meaning that only a small number of packets (or no packets) are waiting in the queue—are assigned to the "mouse flow" group, while the flows for which the respective number is equal to or greater than the selected threshold are assigned to the "elephant flow" group. After grouping the flows in this manner, the control circuit goes on to transmit the packets in the mouse flow group that are forwarded to the given egress interface with higher priority than the flows in the elephant flow group.

In other words, prioritization is based on a simple threshold criterion, which effectively creates exactly two transmit queues, one for mouse flows and the other for elephant flows. The group assignment for each flow can be based on a counter, which is incremented when a packet is received in the queue and decremented when it is transmitted to the network. The mouse flows are typically transmitted with strict priority over the elephant flows. Within each of the flow groups, however, the packets are simply transmitted in the order in which they were received and queued for transmission through the egress interface.

The procedure described above for assigning flows to the mouse and elephant groups is carried out repeatedly in each of a succession of arbitration cycles. Thus, the number of queued packets in each flow is continually reassessed, and a "mouse" flow may consequently be reassigned to the "elephant" group if it now has a number of packets in the queue that is greater than the selected threshold. By the same token, when an "elephant" flow has only a small number of packets (or no packets) to transmit, it will be reassigned to the "mouse" group. Each new arbitration cycle is initiated in response to an arbitration event, such as after a certain predefined number of queued packets have been selected for transmission and/or upon expiration of a predefined time period. (To avoid queue starvation, "elephant" flows are moved to the "mouse" group only after one or both of these events has actually occurred.)

System Description

FIG. 1 is a block diagram that schematically illustrates a network communication system 20 implementing adaptive flow prioritization, in accordance with an embodiment of the invention. The operation of system 20 is illustrated by a switch 22, which has multiple interfaces, in the form of ports 26, connected to a packet data network 24, such as an Ethernet or InfiniBand switch fabric. The ports typically comprise suitable physical-layer (PHY) and data-link layer interface circuits, as are known in the art. Ports 26, which are labeled with letters A-H for clarity in the description that follows, are configured to serve as ingress and egress ports (or equivalently, ingress and egress interfaces) to network 24. Although for the sake of illustration, ports 26A-D serve in FIG. 1 as ingress ports, while ports 26E-H serve as egress ports, in practice all ports 26 are typically configured for bidirectional operation, as both ingress and egress ports.

Ports 26 receive packets from network 24 belonging to multiple flows, for forwarding to respective egress interfaces for transmission to the network. For example, in the pictured embodiment, port 26A receives a packet 32, belonging to "flow X," followed by a packet 36, belonging to "flow Y." Port 26C meanwhile receives a packet 34, belonging to "flow Z." Assuming network 24 to be an Internet Protocol (IP) network, packet flows can be identified by the packet 5-tuple (source and destination IP addresses and ports, along with the transport protocol). Alternatively, any other suitable flow identifier may be used.

Switch 22 comprises control circuitry, in the form of forwarding and queuing logic 30, which forwards incoming packets 32, 34, 36, . . . , to the appropriate egress ports 26 for transmission to network 24. In the pictured example, flows X, Y and Z are all forwarded to the same egress port 26F. Logic 30 queues the packets that are destined for each egress port in transmit queues in a memory 28, while the packets await their turn for transmission. Logic 30 does not necessarily transmit the packets through a given egress port in their order of arrival, however, but rather gives higher priority to "mouse flows," as explained above. Thus, in the pictured example, flow Y is treated as a mouse flow, and packet 36 is therefore transmitted through port 26F to network 24 ahead of packets 32 and 34. The operation of this adaptive prioritization mechanism is described further hereinbelow with reference to FIG. 2.

The configurations of switch 22 and network 24 that are shown in FIG. 1 are example configurations, which are chosen purely for the sake of conceptual clarity. In alternative embodiments, any other suitable network and/or switch configuration can be used. Logic 30 in switch 22 typically comprises hard-wired or programmable logic circuits, such as one or more Application-Specific Integrated Circuits (ASICs) or Field-Programmable Gate Arrays (FPGAs). Alternatively or additionally, at least some of the functions of logic 30 may be implemented in software or firmware running on a programmable processor.

Queue Prioritization

Figure 2:
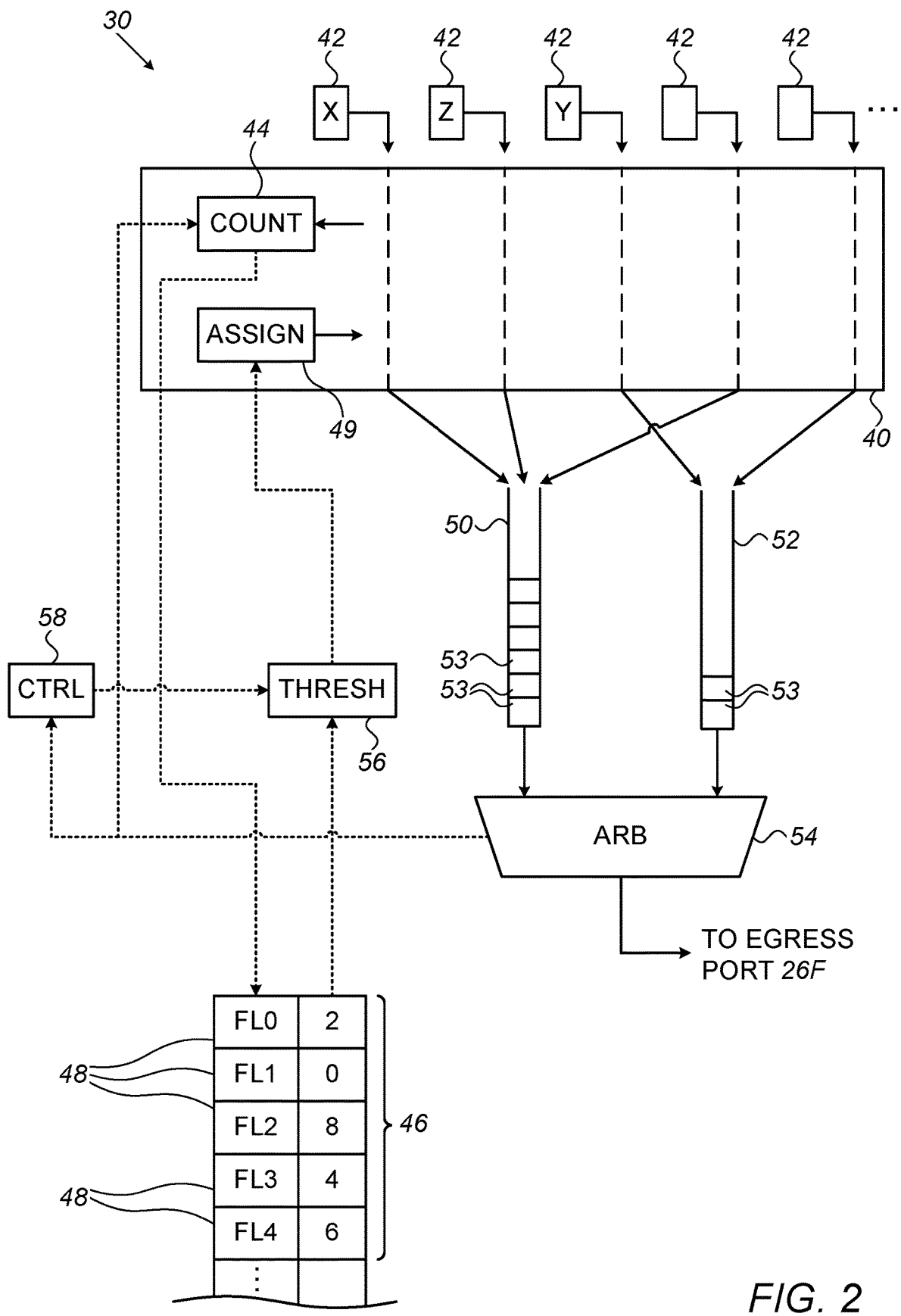
FIG. 2 is a block diagram that schematically illustrates a method for adaptive flow prioritization, in accordance with an embodiment of the invention.

FIG. 2 is a block diagram that schematically illustrates a method for adaptive flow prioritization carried out by forwarding and queuing logic 30 in switch 22, in accordance with an embodiment of the invention. Logic 30 comprises prioritization circuitry 40, which tracks and queues packets in multiple flows 42 that are to be forwarded to a given egress port, such as port 26F in the present example.

Circuitry 40 comprises a counter 44, which counts the number of packets (or, alternatively, the number of bytes) in each of flows 42 that are queued for transmission through port 26F. The counts may be stored in a state table 46, in which each entry 48 corresponds to a different flow. Entries 48 can be keyed for example, by taking a hash over the packet 5-tuple (or over another set of fields in the packet header), with a hash function that is large enough so that the probability of hash collisions is very small. Typically, in each entry, the count is initially set to zero. Counter 44 increments the respective count for a given flow when a packet in the flow is queued for transmission and decrements the count when the packet is transmitted to the network.

An assignment circuit 49 compares the count values in table 46 at a given point in time to an adaptively-selected threshold 56, and thus assigns each flow 42 to either an "elephant flow" group or to a "mouse flow" group. Specifically, circuit 49 assigns the flows for which the respective entry 48 in table 46 contains a count value that is less than threshold 56—meaning that there are relatively few packets in this flow that are currently queued for transmission—to the mouse flow group. The flows for which the respective count value is equal to or greater than threshold 56 are assigned to the elephant flow group. Following these assignments, packets arriving in the elephant flow group (such as those in flows X and Z) are queued, in order of arrival, in an elephant flow queue 50, while those in the mouse flow group (such as those in flow Y) are queued in order of arrival in a mouse flow queue 52. Entries 53 in queues 50 and 52 may comprise, for example, descriptors that point to the locations of corresponding packets awaiting transmission in memory 28.

Additionally or alternatively, circuitry 40 may make an assessment of the transmission rate and/or the occurrence of transmission bursts (referred to as "burstiness") in at least some of flows 42, and may then apply this assessment in assigning the flows to queue 50 or queue 52.

An arbiter 54 selects entries 53 from queues 50 and 52 and transmits the corresponding packets to network 24 via egress port 26F. Arbiter 54 assigns higher priority to queue 52 (the mouse flows) than to queue 50 (the elephant flows). Consequently, packets belonging to small, short-lived flows will generally be forwarded ahead of those in large, persistent flows. Arbiter 54 typically applies a strict priority scheme, in which all packets waiting in queue 52 are transmitted before servicing queue 50.

The assignments of flows to the elephant and mouse flow groups, with their corresponding queues 50 and 52, is generally not static, but is rather updated in each of a succession of arbitration cycles. Assignment circuit 49 initiates each new arbitration cycle in response to a certain arbitration event or set of events. (Flows can be transferred from mouse flow queue 52 to elephant flow queue 50 at any time, but as noted earlier, transfer from elephant flow queue 50 to mouse flow queue 52 can occur only after a specified arbitration event has occurred.) One such arbitration event, for example, could be expiration of a timer, which determines the maximum lifetime of a given set of flow group assignments. Alternatively or additionally, arbitration events may be triggered by arbiter 54, for example in response to having transmitted a certain number of packets or a certain volume of data. Further additionally or alternatively, after a given flow in the mouse flow group has contributed a certain number of packets to queue 52, assignment circuit 49 may immediately transfer the flow to the elephant flow group and queue 50.

Although FIG. 2 shows only a single pair of elephant and mouse flow queues 50, 52 feeding arbiter 54, in some embodiments, switch 22 receives and forwards packets belonging to multiple different traffic classes, which have different, respective levels of quality of service (QoS). In this case, prioritization circuitry 40 assigns flows 42 to different queues not only according to whether they are "elephants" or "mice," but also according to the traffic classes. The methods of adaptive flow prioritization that are described herein may then be applied separately to one or more of the traffic classes, or to all of the traffic classes. Thus, logic 30 may maintain separate pairs of elephant and mouse queues for each traffic class to which adaptive flow prioritization is to be applied. Arbiter 54 arbitrates separately among the elephant and mouse flows in each of these different traffic classes.

Forwarding and queuing logic 30 comprises threshold control logic 58 for setting threshold 56, typically in accordance with instructions input by an operator of system 20. The threshold may be fixed, or it may alternatively vary dynamically, in response to conditions in switch 22 and/or network 24. In the present embodiment, logic 58 performs sets threshold 56 adaptively, based on the actual transmission of packets through egress port 26F. For this purpose, logic 58 monitors the volumes of the packets that are transmitted to network 24 from the flows in the mouse and elephant groups, i.e., from queues 50 and 52, respectively, as reported by arbiter 54. Logic 58 then sets threshold 56 in responsive to a relation between the packet volumes, such as the relative percentages of bandwidth consumed by packets transmitted from queues 50 and 52.

For this purpose, for example, an operator of system 20 may set a target allocation of transmission volume to the elephant group, such as the target percentage of the bandwidth that is to be consumed by the elephant flows (assuming there is sufficient mouse traffic to consume the rest of the bandwidth). Threshold control logic 58 computes a relation between the respective volumes of packets that were actually transmitted from queues 50 and 52 over a given period, such as the respective percentages of the total transmitted bandwidth, and compares this relation to the target allocation. When this comparison indicates that the actual allocation of the transmission volume to the elephant group (queue 50) was less than the target allocation during the given period, logic 58 will increase threshold 56, so that fewer flows will be assigned to queue 52, and more bandwidth will be available for the elephant flows. On the other hand, when the comparison indicates that the actual allocation of the transmission volume to the elephant group was greater than the target allocation during the given period, logic 58 will decrease the threshold.

Despite the change in threshold 56, arbiter 54 maintains the strict priority of mouse queue 52 over elephant queue 50, as well as strict priority in transmission of the packets within each queue, and also prioritizes transmission of different traffic classes according to QoS, as explained above. These factors can complicate and introduce inaccuracies into the threshold-setting computations performed by logic 58, particularly when a fixed value of the target allocation is used. Therefore, in some embodiments, the target allocation of transmission volume to the elephant flows is computed using a simulated, weighted allocation of the transmission volume, based on the respective numbers of the packets queued in the flows that are assigned to queues 50 and 52.

For this purpose, threshold control logic 58 may compute a "shadow" weighted arbitration between queues 50 and 52, in which the strict priorities are no longer maintained. This is a "shadow" arbitration in the sense that it is a simulated arbitration, carried out in the background, to estimate the volume of packets that would be transmitted in the absence of strict priority; but it is not actually applied by arbiter 54 in transmitting the packets. For example, logic 58 may compute a shadow weighted round robin arbitration, based on relative queue weights that can be assigned by the system operator, and thus find the percentage of the bandwidth that would have been allocated to elephant queue 50 given these weights and the actual queue lengths. If logic 58 then finds that the bandwidth consumed by packets transmitted from queue 50 to network 24 was less than this percentage, it will increase threshold 56; or it will decrease the threshold if the bandwidth consumed was greater than the percentage, as explained earlier.

As another example, logic 58 may apply a weighted token bucket algorithm in deciding whether to increase or decrease threshold 56. In this case, logic 58 assigns a respective number of tokens to each of queues 50 and 52 in proportion to the target allocation of bandwidth. The tokens are then consumed as packets are transmitted from the respective queues. When one or both of the "buckets" are empty, logic 58 compares the token consumption to the target allocation and thus increases or decreases threshold 56 as appropriate. The buckets are then refilled, and the process repeated. Alternatively, logic 58 may apply other sorts of weighted arbitration algorithms in assessing the relative allocation of transmission volumes to the mouse and elephant queues.

In some embodiments of the present invention, the separation of flows 42 into elephant and mouse groups can also be used in applying congestion avoidance protocols, such as dropping and/or marking of packets in case of congestion. Specifically, when switch 22 receives an indication of congestion in network 24, logic 30 may apply the specified congestion avoidance protocol to the flows in the elephant flow group but not to the flows in the mouse flow group. This approach is advantageous in that it applies congestion control specifically to the larger, more persistent flows that are generally responsible for the congestion, while minimizing the effect of the congestion avoidance measures on the more sensitive, smaller flows. Furthermore, the count values in table 46 can be used in making congestion control decisions, thus enabling logic 30 to apply congestion avoidance measures selectively to the larger flows, based on the respective numbers of the packets that they have queued for transmission.

Although the embodiments described above relate specifically, for the sake of clarity and completeness, to network switches, the principles of the present invention may similarly be applied to network switching elements of other sorts, such as bridges and routers, as well as to other sorts of network elements having multiple inputs and outputs, such as suitable types of network interface controllers. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
   receiving from a packet data network, via ingress interfaces of a switching element, packets belonging to multiple flows, and forwarding the packets to respective egress interfaces of the switching element for transmission to the network;
   for each egress interface of the switching element, queuing the packets, belonging to a plurality of the flows, that have been forwarded for transmission through the egress interface; and
   for each of one or more of the egress interfaces, in each of a succession of arbitration cycles:
      assessing a respective number of the packets in each of the plurality of the flows that are queued for transmission through the egress interface;
      assigning the flows for which the respective number is less than a selected threshold to a first group, while assigning the flows for which the respective number is equal to or greater than the selected threshold to a second group;
      after assigning the flows, transmitting to the network the received packets that have been forwarded to the egress interface and belong to the flows in the first group with a higher priority than the flows in the second group; and
      selecting the threshold adaptively, responsively to the transmission of the packets through the egress interface,
   wherein selecting the threshold comprises monitoring respective first and second volumes of the packets that are transmitted to the network from the flows in the first and second groups, and setting the threshold responsively to a relation between the first and second volumes, and
   wherein setting the threshold comprises:
      defining a target allocation of transmission volume to the second group;
      increasing the threshold when the relation between the first and second volumes indicates that an actual allocation of the transmission volume to the second group was less than the target allocation during a given period; and
      decreasing the threshold when the relation between the first and second volumes indicates that the actual allocation of the transmission volume to the second group was greater than the target allocation during a given period.

2. The method according to claim 1, wherein assessing the respective number comprises:
   maintaining a respective counter for each flow among the plurality of the flows;
   incrementing the respective counter when a packet in the flow is queued for transmission; and
   decrementing the counter when the packet is transmitted to the network.

3. The method according to claim 1, wherein defining the target allocation comprises simulating a weighted allocation of the transmission volume based on respective numbers of the packets queued in the flows that are assigned to the first group and to the second group.

4. The method according to claim 1, and comprising initiating a new arbitration cycle in the succession in response to an arbitration event,
   wherein assessing the respective number comprises reassessing the respective number of the packets in each of the plurality of the flows that are queued for transmission upon initiation of the new arbitration cycle, and
   wherein assigning the flows comprises reassigning the flows to the first and second groups based on the reassessed number.

5. The method according to claim 1, wherein transmitting the packets comprises transmitting the packets that belong to the flows in the first group with a strict priority over the flows in the second group.

6. The method according to claim 1, wherein transmitting the packets comprises transmitting the packets within each of the first and second groups in an order in which the packets have been queued for transmission.

7. The method according to claim 1, wherein the packets belong to multiple different traffic classes, which have different, respective levels of quality of service (QoS), and wherein queuing the packets comprises assigning the flows to different queues according to the traffic classes, and wherein transmitting the packets comprises arbitrating separately among the flows in each of one or more of the different traffic classes.

8. Communication apparatus, comprising:
multiple interfaces configured to serve as ingress and egress interfaces to a packet data network and to receive packets belonging to multiple flows for forwarding to respective egress interfaces for transmission to the network;
control circuitry, which is configured to queue the packets, belonging to a plurality of the flows, for transmission through each egress interface, and for each of one or more of the egress interfaces, in each of a succession of arbitration cycles:
to assess a respective number of the packets in each of the plurality of the flows that are queued for transmission through the egress interface;
to assign the flows for which the respective number is less than a selected threshold to a first group, while assigning the flows for which the respective number is equal to or greater than the selected threshold to a second group; and
after assigning the flows, to transmit to the network the packets that have been forwarded to the egress interface and belong to the flows in the first group with a higher priority than the flows in the second group; and
threshold control logic, which is configured to set the threshold adaptively, responsively to the transmission of the packets through the egress interface,
wherein the threshold control logic is configured to monitor respective first and second volumes of the packets that are transmitted to the network from the flows in the first and second groups, and to set the threshold responsively to a relation between the first and second volumes,
wherein setting the threshold comprises:
defining a target allocation of transmission volume to the second group;
increasing the threshold when the relation between the first and second volumes indicates that an actual allocation of the transmission volume to the second group was less than the target allocation during a given period; and
decreasing the threshold when the relation between the first and second volumes indicates that the actual allocation of the transmission volume to the second group was greater than the target allocation during a given period.

9. The apparatus according to claim 8, wherein the control circuitry is configured to assess the respective number of the packets in each of the plurality of the flows that are queued for transmission by maintaining a respective counter for each flow among the plurality of the flows, incrementing the respective counter when a packet in the flow is queued for transmission, and decrementing the counter when the packet is transmitted to the network.

10. The apparatus according to claim 8, wherein defining the target allocation comprises simulating a weighted allocation of the transmission volume based on respective numbers of the packets queued in the flows that are assigned to the first group and to the second group.

11. The apparatus according to claim 8, wherein the control circuitry is configured to initiate a new arbitration cycle in the succession in response to an arbitration event, to reassess the respective number of the packets in each of the plurality of the flows that are queued for transmission upon initiation of the new arbitration cycle, and to reassign the flows to the first and second groups based on the reassessed number.

12. The apparatus according to claim 8, wherein the control circuitry is configured to transmit the packets that belong to the flows in the first group with a strict priority over the flows in the second group.

13. The apparatus according to claim 8, wherein the control circuitry is configured to transmit the packets within each of the first and second groups in an order in which the packets have been queued for transmission.

14. The apparatus according to claim 8, wherein the packets belong to multiple different traffic classes, which have different, respective levels of quality of service (QoS), and wherein the control circuitry is configured to assign the flows to different queues according to the traffic classes, and to arbitrate separately among the flows in each of one or more of the different traffic classes.

15. A method for communication, comprising:
receiving from a packet data network, via ingress interfaces of a switching element, packets belonging to multiple flows, and forwarding the packets to respective egress interfaces of the switching element for transmission to the network;
for each egress interface of the switching element, queuing the packets, belonging to a plurality of the flows, that have been forwarded for transmission through the egress interface;
for each of one or more of the egress interfaces, assessing a respective characteristic of each of the plurality of the flows that are queued for transmission through the egress interface, and setting a priority for the transmission of the packets from each of the flows to the network responsively to a comparison of the respective characteristic to a selected threshold; and
selecting the threshold adaptively, responsively to the transmission of the packets through the egress interface,
wherein selecting the threshold comprises monitoring respective volumes of the packets that are transmitted to the network from the plurality of the flows, defining a target allocation of transmission volume among the flows, and setting the threshold responsively to a relation between the respective volumes that were transmitted to the network and the target allocation.

16. Communication apparatus, comprising:
multiple interfaces configured to serve as ingress and egress interfaces to a packet data network and to receive packets belonging to multiple flows for forwarding to respective egress interfaces for transmission to the network; and
control circuitry, which is configured to queue the packets, belonging to a plurality of the flows, for transmission through each egress interface, and for each of one or more of the egress interfaces:
to assess a respective characteristic of each of the plurality of the flows that are queued for transmission through the egress interface, and to set a priority for the transmission of the packets from each of the flows to the network responsively to a comparison of the respective characteristic to a selected threshold; and to select the threshold adaptively, responsively to the transmission of the packets through the egress interface, wherein the threshold is selected by monitoring respective volumes of the packets that are transmitted to the network from the plurality of the flows, defining a target allocation of transmission volume among the flows, and setting the threshold responsively to a relation between the respective volumes that were transmitted to the network and the target allocation.

* * * * *